May 20, 1924.
M. RODIN
1,494,976
SAFETY BRAKE
Filed June 22 1922
2 Sheets-Sheet 1
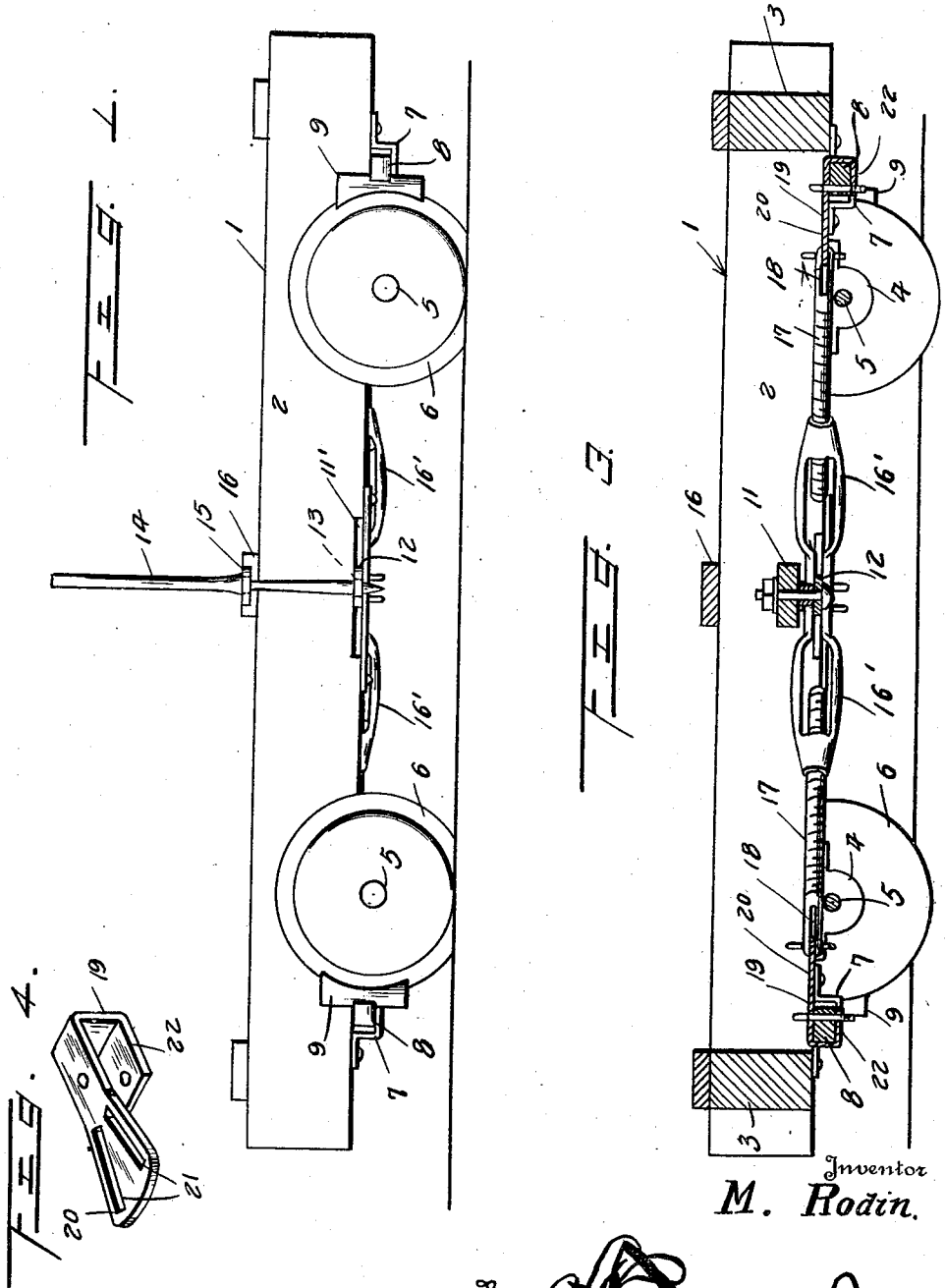
Inventor
M. Rodin.
By 
Attorney

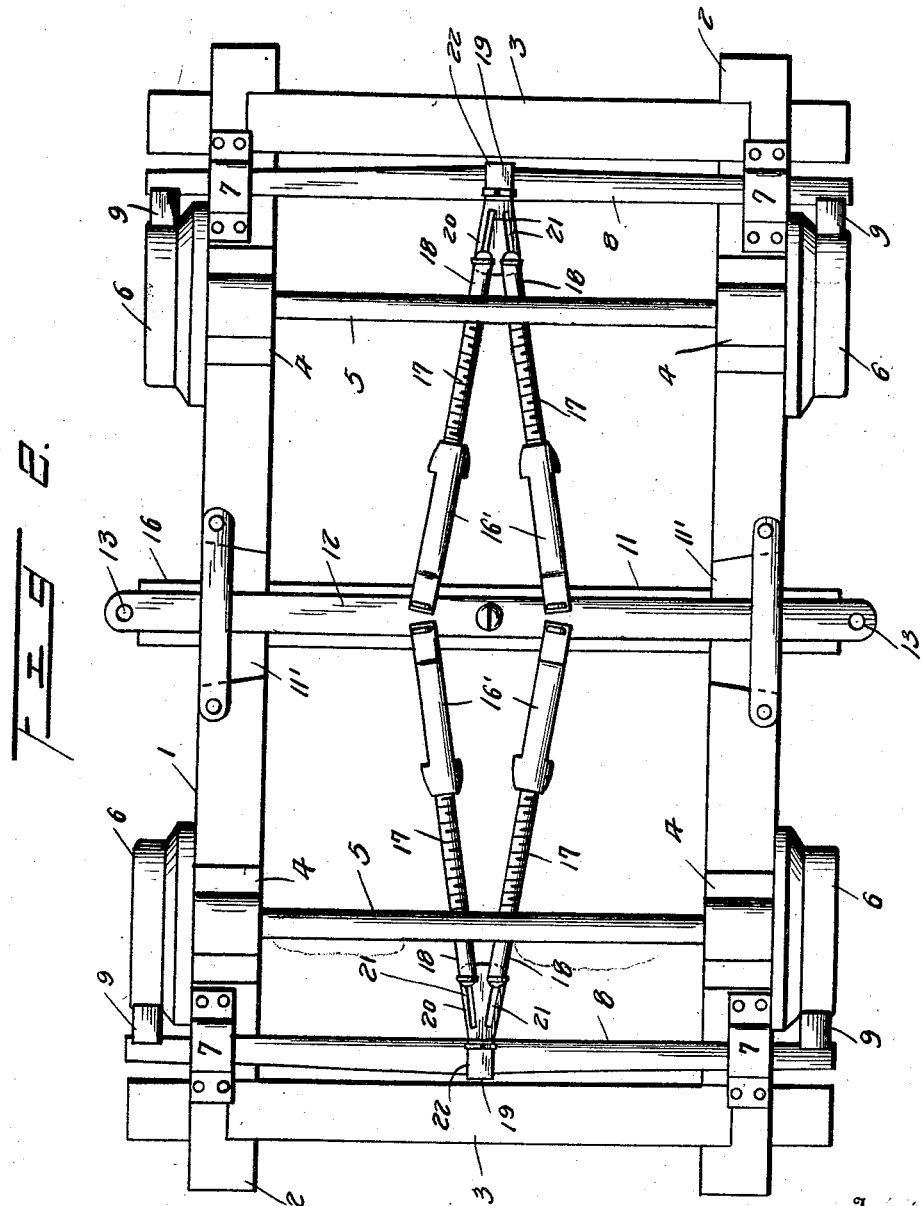

Patented May 20, 1924.

1,494,976

UNITED STATES PATENT OFFICE.

MATE RODIN, OF FORT BRAGG, CALIFORNIA.

SAFETY BRAKE.

Application filed June 22, 1922. Serial No. 570,124.

*To all whom it may concern:*

Be it known that I, MATE RODIN, a subject to Alexander, King of Jugoslavia, residing at Fort Bragg, in the county of Mendocino and State of California, have invented certain new and useful Improvements in Safety Brakes; and I do hereby declare the following to be a full, clear, and exact description of the invention, such as will enable others skilled in the art to which it appertains to make and use the same.

This invention relates to new and useful improvements in railway car brakes and has for its primary object the provision of means whereby the brake shoes may be applied to the wheels by movement of an operating medium in either direction from a neutral or non-brake applying position, consequently obviating any possibility of a person not quickly applying the brakes of the car by failing to move the operating medium in the proper direction.

Another object of this invention is the provision of a car brake of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation illustrating a car brake constructed in accordance with my invention, Figure 2 is a bottom plan view illustrating the same, Figure 3 is a longitudinal sectional view illustrating the same, Figure 4 is an enlarged detail view illustrating the brake rod clamp.

Referring in detail to the drawings, the numeral 1 indicates a railroad car of any well known type having the usual side and end sills 2 and 3 and the side sills are provided with journals 4 to rotatably support the axle 5 carrying the wheels 6. Located adjacent to the journals are brake beam brackets 7 that slidably support brake beams 8 which carry at their outer ends brake shoes 9 for engagement with the peripheries of the wheels for the purpose of retarding the rotation of the wheels when desired. The side sills 2 intermediate their ends are connected by a brace 11 and also are provided with recesses 11' to permit an operating bar 12 pivoted upon the brace 11 to swing freely and each end of the bar 12 is provided with an opening 13 to receive the lower ends of actuating bars 14 mounted for rocking motion in brackets 15 carried by a brace 16 extending parallel with the brace 11 and upon the top faces of the side sills. The normal position of the actuating bars is vertical and by swinging the bars in either direction and endwise relatively to the car, the actuating bar 12 will be rocked upon its pivot. Pairs of cuffs 16' are pivoted to the bar 12 upon opposite sides of its surface and have threaded thereto brake rods 17 which are provided with bifurcated ends 18 adapted to straddle clamp plates 19 which include substantially triangular shaped portions 20 provided with diverging slots 21 to receive bolts after passing through the bifurcated ends of the brake rod. The slot 21 provides for a freely slidable pin and slot connection between the brake rods 17 and the clamp plates 19. The clamp plates are provided with attaching portions 22 that partially encircle the brake beams 8 and are secured thereto. By arrangement of the slots and the connection of the brake rods on opposite sides of the pivot of the actuating bar 12, the movement of the latter in either direction by the operating bars, will cause an application of the brake shoes to the wheels of the car, consequently obviating any possibility of a person not applying the brake shoes to the wheels instantaneously by failing to move the actuating bars in the proper direction.

In the operation of a brake constructed in accordance with my invention, when either actuating bar 14 is moved forwardly of the position shown in Figure 1 the pivoted bar 12 is rocked on its pivot and the brake rods 17 of each pair of brake rods are moved in opposite directions, one brake rod of each pair sliding freely in a rearward direction through the medium of its pin and slot connection with its respective clamp plate 19 and the other brake rod of each pair pulling the clamp plates toward each other to apply the brakes. The movement of the actuating bar in a rearward direction causes other brake rods 17 to become actively engaged and draw the clamp plates toward each other to apply the brakes. The movement of the actuating bar at the right of the car, in a forward direction, causes the same operation of parts as does movement of the actuating bar 14, at the left of the car, in a rearward direction. The reverse of this is also true and movement of the actuating bar 14 at the right of the car, in the rearward direction causes an operation of the parts in the same manner as the movement of the actuating bar 14 at the left of the car, causes when moved in a forward direction.

While I have shown and described the preferred embodiment of my invention, it will be understood that minor changes in construction, combination and arrangement of parts may be made without departing from the spirit and scope of the invention as claimed.

Having thus described my invention what I claim is:

1. A car brake including brake beams having brake shoes, a pivoted bar, operating rods pivotally mounted and connected to said bar, cuffs pivoted to the bar upon each side of its pivot, brake rods threaded to said cuffs, and means connecting the brake rods to the brake beams to cause the shoes to engage the wheels upon the movement of the bar in either direction on its pivot.

2. A brake for cars including brake beams having brake shoes, a pivoted bar, means for moving said bar in either direction, brake rods connected to said bar upon each side of its pivot, clamping plates secured to the brake beams and having slots, means extending through the slots and secured to the brake rods to cause the shoes to engage the wheels of a car by the movement of the bar in either direction.

3. A car brake including brake beams having brake shoes, a pivoted bar, operating rods pivotally mounted and connected to said bar, cuffs pivoted to the bar on opposite sides of its pivot, brake rods threaded to said cuffs, clamping plates secured to the brake beams and having slots, and means extending through the slots and secured to the brake rods to cause the shoes to engage the wheels of a car by movement of the bar in either direction.

In testimony whereof I affix my signature in presence of two witnesses.

MATE RODIN.

Witnesses:
 DAVID A. MILLAR,
 CHRIST GEBELJA.